(12) United States Patent
Wang et al.

(10) Patent No.: US 10,288,790 B2
(45) Date of Patent: May 14, 2019

(54) LIGHT GUIDE PLATE, MANUFACTURING METHOD THEREOF, BACKLIGHT SOURCE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Huijuan Wang, Beijing (CN); Wei Wang, Beijing (CN); Xue Dong, Beijing (CN); Fei Wang, Beijing (CN); Yang You, Beijing (CN); Zhaokun Yang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/745,039

(22) PCT Filed: Aug. 14, 2017

(86) PCT No.: PCT/CN2017/097324
§ 371 (c)(1),
(2) Date: Jan. 15, 2018

(87) PCT Pub. No.: WO2018/129918
PCT Pub. Date: Jul. 19, 2018

(65) Prior Publication Data
US 2019/0011625 A1 Jan. 10, 2019

(30) Foreign Application Priority Data
Jan. 12, 2017 (CN) .......................... 2017 1 0020867

(51) Int. Cl.
*F21V 8/00* (2006.01)
*G02B 27/09* (2006.01)

(52) U.S. Cl.
CPC .......... *G02B 6/0016* (2013.01); *G02B 6/0031* (2013.01); *G02B 27/0944* (2013.01); *G02B 6/009* (2013.01); *G02B 6/0068* (2013.01)

(58) Field of Classification Search
None
See application file for complete search history.

(56) References Cited

U.S. PATENT DOCUMENTS

2010/0157433 A1 6/2010 Mukawa et al.
2011/0286237 A1* 11/2011 Tanoue ................ G02B 6/0016
362/606

(Continued)

FOREIGN PATENT DOCUMENTS

CN 101750738 A 6/2010
CN 102707368 A 10/2012

(Continued)

OTHER PUBLICATIONS

International Search Report & Written Opinion dated Nov. 23, 2017, regarding PCT/CN2017/097324.

*Primary Examiner* — Elmito Breval
(74) *Attorney, Agent, or Firm* — Intellectual Valley Law, P.C.

(57) ABSTRACT

The present disclosure provides a light guide plate, a manufacturing method thereof, a backlight source and a display device. The light guide plate includes: a first surface, a second surface, and at least one blazed gating structure that is on the second surface of the light guide plate, wherein light incident from the first surface of the light guide plate forms a total reflection in the light guide plate after the light (Continued)

irradiates the at least one blazed gating structure and is diffracted by the at least one blazed grating structure.

20 Claims, 5 Drawing Sheets

(56) References Cited

U.S. PATENT DOCUMENTS

| | | | |
|---|---|---|---|
| 2013/0242555 A1 | 9/2013 | Mukawa | |
| 2014/0098563 A1* | 4/2014 | Kim | G02B 6/0076 362/606 |
| 2015/0192724 A1* | 7/2015 | Itoga | G02F 1/133615 362/613 |
| 2015/0260897 A1* | 9/2015 | He | G02B 6/0016 362/612 |
| 2016/0033705 A1* | 2/2016 | Fattal | G02B 6/0068 349/15 |
| 2016/0109639 A1* | 4/2016 | Kurata | G02F 1/133615 349/65 |
| 2017/0052375 A1* | 2/2017 | Takeda | G02B 27/0172 |
| 2017/0205618 A1* | 7/2017 | Basset | G02B 6/00 |
| 2018/0196182 A1* | 7/2018 | Wang | G02B 6/0003 |

FOREIGN PATENT DOCUMENTS

| | | |
|---|---|---|
| CN | 103309035 A | 9/2013 |
| CN | 105652511 A | 6/2016 |

* cited by examiner

LIGHT GUIDE PLATE, MANUFACTURING METHOD THEREOF, BACKLIGHT SOURCE AND DISPLAY DEVICE

CROSS-REFERENCE TO RELATED APPLICATION

This application is a national stage application under 35 U.S.C. § 371 of International Application No. PCT/CN2017/097324, filed Aug. 14, 2017, which is based upon and claims the priority of Chinese Patent Application No. 201710020867.7 filed on Jan. 12, 2017, the entire contents of which are hereby incorporated by reference herein for all purposes.

TECHNICAL FIELD

The present disclosure relates to the display technology, and in particular to a light guide plate, a manufacturing method thereof, a backlight source and a display device.

BACKGROUND

In the technical field of liquid crystal display, the liquid crystal display (LCD) does not emit light, and a backlight source is usually arranged on a hack surface of the LCD to implement image display.

Backlight sources may be divided into a direct-down type and an edge type according to positions of the light sources in backboards. The edge type backlight source has the characteristic that the light source is on an edge of the backboard, light emitted by the light source directly enters a light guide plate and the light guide plate causes the light from the light source to form an area light source covering the whole backboard. The direct-down type backlight source has the characteristic that the light source is laid on the whole backboard and light from the light source is emitted to an LCD through the light guide plate arranged in the above. In order to achieve a relatively better light mixing effect, the direct-down type backlight source requires a relatively longer light mixing distance, i.e. a relatively longer distance between the light source and the light guide plate. However, because the edge type backlight source has no requirement on the light mixing distance, the edge type backlight source is widely used due to its characteristics of lightness, thinness, low power consumption and the like.

SUMMARY

The present disclosure provides a light guide plate, a manufacturing method thereof, a backlight source and a display device.

On one aspect, a light guide plate is provided. The light guide plate may include a first surface; a second surface; and at least one blazed grating structure on the second surface, where the at least one blazed grating structure may be configured to diffract light incident from the first surface, where the light incident forms a total reflection in the light guide plate after the light irradiates the at least one blazed grating structure.

Optionally, the second surface of the light guide plate has a rectangular shape, the at least one blazed grating structure comprises at least one first blazed grating structure, the at least one first blazed grating structure is proximal to a first edge of the second surface.

Optionally, one of the at least one first blazed eating structure along the first edge has a length that is substantially equal to a length of the first edge.

Optionally, the at least one blazed grating structure may include multiple first blazed gating structures alone the first edge of the second surface, and adjacent first blazed gating structures are separated by a distance.

Optionally, the at least one blazed grating structure may include at least one second blazed grating structure proximal to a third edge of the second surface, the third edge is an edge parallel to the first edge, each of the at least one second blazed grating structure corresponds to one of the first blazed grating structure.

Optionally, the at least one blazed grating structure may include at least one third blazed grating structure proximal to a second edge of the second surface, the second edge is an edge adjacent to the first edge.

Optionally, one of the at least one third blazed grating structure along the second edge has a length that is substantially equal to a length of the second edge.

Optionally, the at least one third blazed grating structure may include multiple third blazed grating structures, and adjacent third blazed gating structures are separated by a distance.

Optionally, the at least one blazed grating structure may include at least one fourth blazed grating structure proximal to a fourth edge of the second surface, the fourth edge is an edge parallel to the second edge, each of the at least one fourth blazed grating structure corresponds to one of the third blazed grating structure.

Optionally, the at least one, blazed grating structure may include fifth blazed grating structures, where the fifth blazed grating structures are grouped into a plurality of groups of fifth blazed grating structures that are in a middle area of the second surface, each group of fifth blazed grating structures comprises two crossed fifth blazed grating structures.

Optionally, the two crosses fifth blazed grating structures are crossed with an angle that is substantially 90°.

Optionally, the light incident from the first surface exits from the blazed grating structure, and the light exits from the blazed grating structure incident to the surface of the light guide plate at an angle $\varphi$, $\varphi c$ is a total reflection critical angle of the light guide plate, $\varphi$ being not smaller than $\varphi_c$, $$\Phi_c = \arcsin(1/n) \text{ and}$$

$$2d \sin\theta \cos(\alpha-\theta) = k\lambda,$$

where n is a refractive index of a material of the light guide plate, $\alpha$ is an angle between the incident light and a macro plane normal of the blazed grating structure, d is a groove spacing of the blazed grating structure, $\theta$ is a blazing angle of the blazed gating structure, k is an interference level, $\lambda$ is a blazed wavelength, and an angle between di meted light of the blazed grating structure and the macro plane normal of the blazed grating structure is $\beta=2\theta-\alpha$.

Optionally, the first surface is an incident surface and the second surface is an emergent surface.

The present disclosure provides a backlight source. The backlight source may include the light guide plate described above, and further may include: multiple light sources on a side of the first surface of the light guide plate.

Optionally, the first surface is opposite to the second surface, each of the multiple light source corresponds to one of the first blazed grating structure.

Optionally, the backlight source may also include scattering structures on the first surface configured to scatter the light in the light guide plate.

The present disclosure provides a display device. The display may include backlight source described above.

The present disclosure also provides a method of manufacturing a light guide plate. The method may include providing a light guide plate substrate, forming a groove of at least one blazed grating structure in a surface of the light guide plate substrate, and forming a metal reflective layer on the groove to form the blazed grating structure.

Optionally, forming the metal reflective layer on the groove to form the blazed grating structure may include depositing a metal reflective layer on the groove.

Optionally, forming the groove of at least one blazed grating structure in the first surface includes coating a photoresist layer on a second surface of the light guide plate substrate, exposing the photoresist layer with a mask plate, developing the exposed photoresist layer to obtain a photoresist pattern, and etching the light guide plate substrate to from a groove.

It is to be understood that both the forgoing general description and the following detailed description are exemplary only, and are not restrictive of the present disclosure.

BRIEF DESCRIPTION OF THE DRAWINGS

In order to more clearly illustrate the technical solutions in the embodiments of the present disclosure, drawings needing to be used in descriptions of the embodiments will be simply introduced. The drawings described below are only some embodiments of the present disclosure. Without creative work, a person of ordinary skill in the art may also obtain other drawings according to these drawings.

Figure 1:
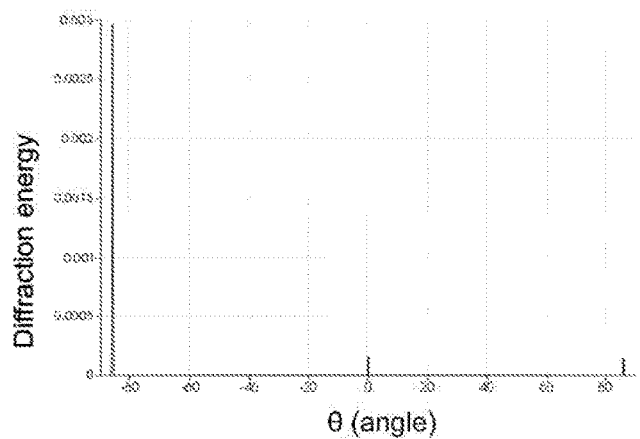
FIG. 1 is schematic diagram of a diffraction simulation result of a blazed grating.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

In order to make the technical problem to be solved, technical solutions and advantages of the present disclosure clearer, detailed descriptions will be made below with reference to the drawings and specific embodiments.

The terminology used in the present disclosure is for the purpose of describing exemplary examples only and is not intended to limit the present disclosure. As used in the present disclosure and the amended claims, the singular forms "a" "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

In order to improve image display contrast of a liquid crystal display (LCD) and mitigate the problems of LCD dynamic ghosting and the like, a scanning backlight technology is proposed. The scanning backlight technology refers to dividing the LCD into multiple areas in a certain direction, and each area is called an optical partition which may be a rectangular shape. The backlight source may be further divided into multiple optical partitions corresponding to those of the LCD. Projections of each optical partition of the backlight source and projections of the corresponding optical partition of the LCD positioned above the backlight source in a perpendicular direction are overlapped. Light from each optical partition of the backlight source is emitted to the LCD to provide a light source for image display.

For any optical partition of the LCD, when a liquid crystal response curve corresponding to the optical partition is in a flat stage, the backlight source corresponding to the optical partition is controlled to be turned on. Since the liquid crystal display principle is to control deflection of liquid crystal molecules through line-by-line scanning, the backlight source is correspondingly turned on using area-by-area scanning to provide a light source for a corresponding area of the LCD. When the liquid crystal response curve is in a slowly rising or dropping stage (i.e. a response stage), the light source corresponding to the optical partition is turned off, and the light source corresponding to the optical partition is turned on in the flat stage of the liquid crystal response curve. An optical distribution of multiple optical partitions provided for the LCD by the backlight source is uniform when one optical partition of the backlight source is turned on. The corresponding emergent light may not affect an adjacent area. It is ensured that the backlight source is in an off state in a liquid crystal response stage of the adjacent area, and thus the phenomenon of light leakage of the LCD is prevented.

The light source of the existing edge type backlight source is arranged on the edge of the backboard. This is also call a lateral surface. A Light Emitting Diode (LED) is usually used as the light source, an emergent angle of light emitted by the LED is usually between 115 degrees and 120 degrees, and the light is divergent, so that it is difficult for the light to form a rectangular optical partition after entering the light guide plate. Moreover, there are dark areas between adjacent optical partitions of the edge type backlight source. Thus, images displayed by the LCD have a poor quality.

The light source of the direct-down type backlight source is laid on a backboard, and the light source on the backboard forms multiple optical partitions. Ideal optical partitions may be obtained by controlling LEDs in the rectangular optical partitions to be turned on and turned off. Dark areas between the optical partitions may also be avoided. However, the direct-down type backlight source does not have the characteristics of lightness, thinness, low power consumption or the like.

Thus, it is difficult for the edge type backlight source to meet optical partitions of the scanning backlight technology and therefore it is difficult for the scanning backlight technology to be applied to an edge type backlight source system.

In order to resolve this problem, the embodiments of the present disclosure provide a light guide plate, a manufacturing method thereof, a backlight source and a display device, which may achieve an ultrathin backlight source and implement partitioned control over the backlight source.

In the solutions, through arranging the at least one blazed grating structure on the light, guide plate, the blazed grating structure may concentrate light energy in a predetermined direction, for example, in a certain spectral order. Thus, diffraction efficiency of the light may be improved to make the diffracted light fully utilized. Due to the characteristic of the blazed grating structure, the thickness of the direct-down type backlight source may be reduced, an ultrathin backlight source may be obtained, and linear partitioning may be implemented in both a perpendicular direction and a horizontal direction, thereby implementing partitioned control over the backlight source.

As provided in drawings of the present disclosure, the light guide plate is referred as 1, blazed grating structure is referred as 2, 4, 5, 6, and 7. The light source is referred as 3.

A grating structure may diffract light. In grating diffraction, a diffraction factor may determine spectral line intensity. For a general grating structure, a central maximum value of single-slit diffraction and a zeroth-order principal maximum value of interference are overlapped, and a zeroth-order spectral line occupies most of energy. A blazed grating may transfer a maximum value of diffraction to a non-zeroth-order spectral line, and may reduce intensities of spectral lines of each other order to transfer light energy to a certain fixed non-zeroth order, thereby making diffracted light hilly utilized.

Figure 2:
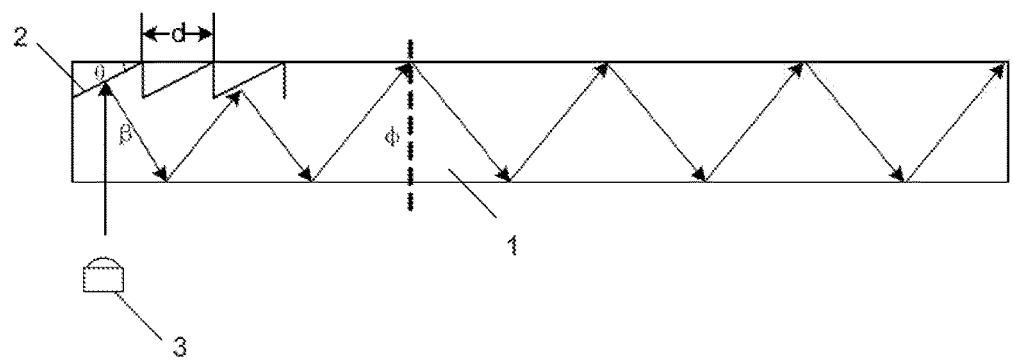
FIG. 2 is a sectional diagram of a light guide plate according to an embodiment of the present disclosure.

A formula of a blazed grating is $2d \sin\theta \cos(\alpha-\theta)=k\lambda$, where $\alpha$ is an included angle between incident light and a macro plane normal of the blazed grating structure, d is a groove spacing of the blazed grating structure, $\theta$ is a blazing angle of the blazed grating structure, k is an interference level, $\lambda$ is a blazed wavelength, and an included angle between diffracted light of the blazed grating structure and the macro plane normal of the blazed grating structure is $\beta=2\theta-\alpha$. When an adopted incident light wavelength meets the formula, an energy utilization rate of the diffracted light is maximized. For incident light perpendicular to the micro plane of the blazed grating structure as shown in FIG. 2, $\alpha=0$.

Compared with other plane transmission gratings, a blazed grating may implement directional emission of diffracted light, and diffraction efficiency of the blazed wavelength corresponding to the blazed grating is higher than that of the plane transmission grating. For example, for an optical waveguide material with a refractive index n=1.5, a total reflection critical angle is 41.81°, at this time, a blazing angle is set $\theta=43°$ and an incident light wavelength is $\lambda=450$ nm and then, as shown in FIG. 1, 95% of diffraction energy of incident light $\beta=86°$) perpendicular to the macro plane of the blazed grating is concentrated at the −1st order, diffraction energy at the zeroth order is almost 0 and diffraction energy at the +1st order is less than 5%.

By virtue of the characteristic of the blazed grating, the present embodiment provides a light guide plate, at least one blazed grating structure may be arranged on an emergent surface of light guide plate, light incident from an incident surface of the light guide plate, after irradiating the blazed grating structure and being diffracted by the blazed grating structure, may be totally reflected in the light guide plate. Sometimes, the incident surface may be referred as the first surface and the emergent surface may be referred as the second surface.

In the embodiment, by arranging the at least one blazed grating structure on the light guide plate, the blazed grating structure may concentrate light energy in a predetermined direction, for example, in a certain spectral order. The diffraction efficiency of the light may be improved to make the diffracted light fully utilized. Due to such a characteristic of the blazed grating structure, the thickness of the direct-down type backlight source may be reduced, and an ultrathin backlight source may be obtained. Further, linear partitioning may be implemented in both a perpendicular direction and a horizontal direction to further implement partitioned control over the backlight source.

By setting the blazing angle of the blazed grating structure, an angle at which the diffracted light exiting from the blazed grating structure is incident to the surface of the light guide plate is larger than a total reflection critical angle. As such, the diffracted light is totally reflected in the light guide plate. As shown in FIG. 2, the light incident to the light guide plate 1, after being diffracted by the blazed grating structure 2, the light exits from the blazed grating structure 2 at an angle $\beta$, and is incident to the surface of the light guide plate 1 at an angle $\varphi$. $\varphi_c$ may be a total reflection critical angle of the light guide plate. As long as $\varphi$ is not smaller than $\varphi_c$, the light diffracted by the blazed grating structure 2 may be totally reflected in the light guide plate 1, thereby implementing light propagation in the light guide plate 1, where $\Phi_c=\arcsin(1/n)$ and $2d \sin\theta \cos(\alpha-\theta)=k\lambda$.

In the above formula, n is a refractive index of a material of the light guide plate, a is an included angle between the incident light and a macro plane normal of the blazed grating structure, d is a groove spacing of the blazed grating structure, $\theta$ is the blazing angle of the blazed grating structure, k is an interference level or an interference order, $\lambda$ is a blazed wavelength, and an included angle between diffracted light of the blazed grating structure and the macro plane normal of the blazed grating structure is $\beta=2\theta-\alpha$.

Therefore, a proper blazing angle $\theta$ may be set to make the diffracted light subjected to an action of the blazed grating structure to meet a condition of total reflection in the light guide plate according to the refractive index n of the material of the light guide plate, the incident wavelength $\lambda$, the angle of the incident light $\alpha$, a grating equation and a total reflection critical angle formula. The light emitted by a light source may be coupled into the light guide plate.

The shape of the light guide plate may vary. The light guide plate in the backlight source may be cuboidal in the present disclosure as an example, the example emergent surface of the light guide plate may be a rectangular shape.

Figure 3:
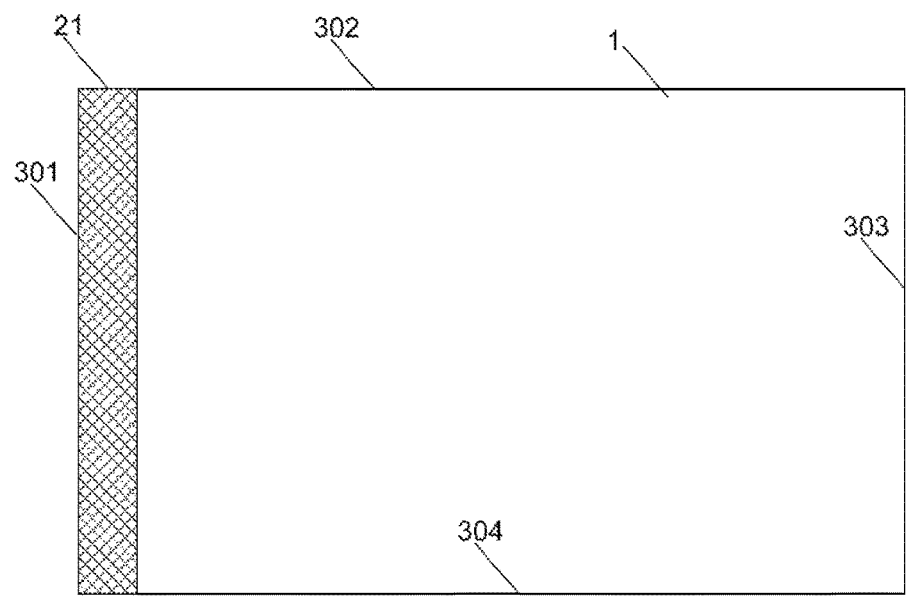
FIG. 3 and FIG. 4 are top views of a light guide plate according to an embodiment of the present disclosure.

As shown in FIG. 3, the emergent surface of the light guide plate 1 is rectangular, and includes a first edge 301, a second edge 302, a third edge 303 and a fourth edge 304, which are sequentially connected end to end. A blazed grating structure, for example, a first blazed grating structure 21 is along and close to the first edge 301, and is arranged on the emergent surface of the light guide plate. An extension direction of the first blazed grating structure 21 is parallel to an extension direction of the first edge.

As shown in FIG. 2, a light source 3 is positioned on one side of the incident surface of the light guide plate that is opposite to the emergent surface. The light source 3 is arranged opposite to the blazed grating structure 2. The light, incident to the light guide plate 1, of the light source, after being diffracted by the blazed grating structure 2, is incident to the surface of the light guide plate 1 again, and is totally reflected for many times in the light guide plate 1. As such, light propagation is implemented. As shown in FIG. 3, the light is propagated in a direction from the first edge to the third edge.

As shown in FIG. 3, when one first blazed grating structure 21 is arranged along the first edge 301, the length of the first blazed grating structure 21 should be as large as possible, so that the light in the light guide plate may be as uniform as possible. As such, the length of the first blazed grating structure 21 may be equal to the length of the first edge. The length of the first blazed grating structure 21 may also be smaller than the length of the first edge.

When multiple first blazed grating structures 21 are arranged along the first edge, adjacent first blazed grating structures 21 are spaced and separated by a predetermined distance.

Figure 4:
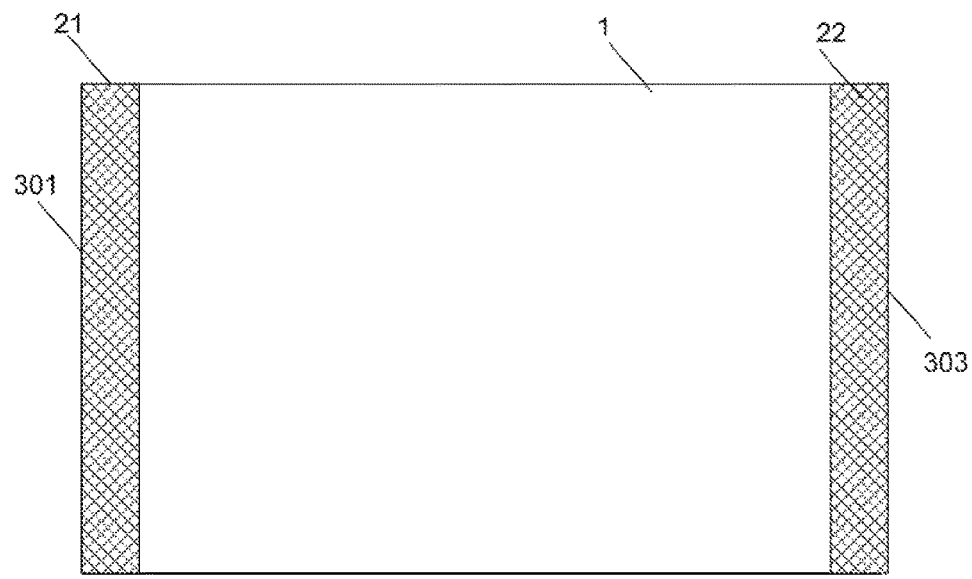

In order to improve luminance of the backlight source, more than one light sources and more than one blazed grating structures that are opposite to the light sources may also be arranged. As shown in FIG. 4, a blazed grating structure as a second blazed grating structure 22 that is close to and along the third edge 303 may also be arranged on the emergent surface of the light guide plate. An extension direction of the second blazed grating structure 22 may be parallel to an extension direction of the third edge 303. The light, incident to the light guide plate 1, of the light source, after being diffracted by the second blazed grating structure 22, may be incident again to the surface of the light guide plate 1, and may be totally reflected for many times in the light guide plate 1. The light propagation may thereby be implemented. As shown in FIG. 4, the light is propagated in a direction from the third edge 303 to the first edge 301.

When only one second blazed grating structure 22 is arranged closes to and along the third edge 303, the length of the second blazed grating structure 22 should be as large as possible, so that the light in the light guide plate may be as uniform as possible. The length of the second blazed grating structure 22 may be equal to the length of the third edge 303. The length of the second blazed grating structure 22 may also be smaller than the length of the third edge 303.

Figure 5:
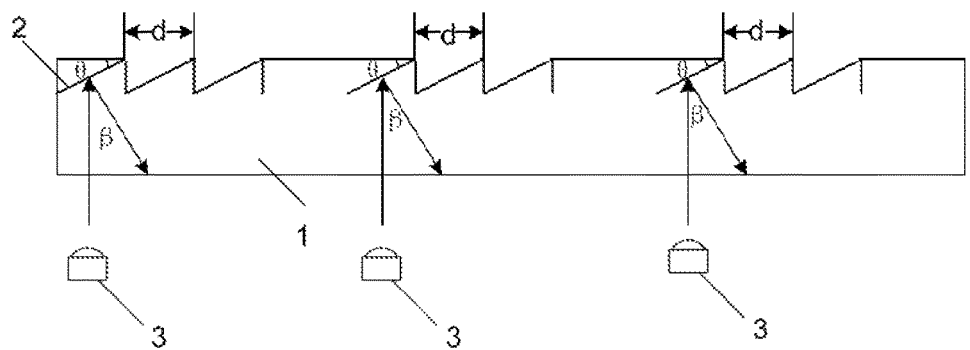
FIG. 5 is a sectional diagram of a light guide plate according to another embodiment of the present disclosure.
Figure 6:
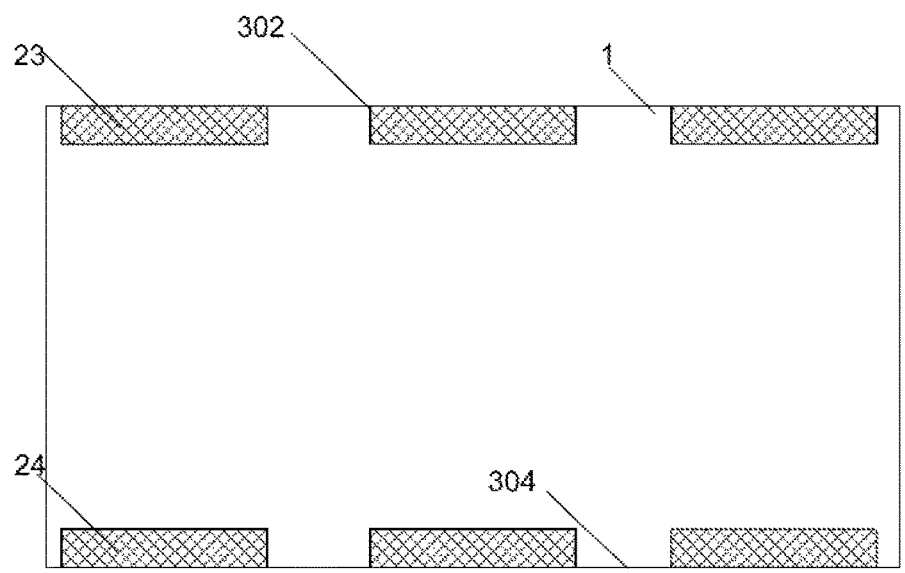
FIG. 6 to FIG. 10 are top views of a light guide plate according to an embodiment of the present disclosure.

As shown in FIG. 5 and FIG. 6, multiple blazed grating structures as third blazed grating structures 23 that are close to and along the second edge 302 may be arranged on the emergent surface of the light guide plate. The extension direction of the third blazed grating structures 23 may be parallel to the extension direction of the second edge, and adjacent third blazed grating structures 23 may be spaced by a predetermined distance.

Each third blazed grating structure 23 corresponds to a light source 3 as shown in FIG. 5. In FIG. 5, light, incident to the light guide plate 1, of the light source, after being diffracted by the third blazed grating structure 23, is incident to the surface of the light guide plate 1 again, and is totally reflected for many times in the light guide plate 1, thereby implementing light propagation. As shown in FIG. 6, the light is propagated in a direction from the second edge 302 to the fourth edge 304.

Further, in order to improve the luminance of the backlight source, more than one light sources and more than one blazed grating structures that are opposite to the light sources may further be arranged. As shown in FIG. 6, multiple blazed grating structures as fourth blazed grating structures 24 that are close to and along the fourth edge 304 are also arranged on the emergent surface of the light guide plate. The extension direction of the fourth blazed grating structures 24 may be parallel to the extension direction of the fourth edge 304, and adjacent fourth blazed grating structures 24 may be spaced by a predetermined distance. The third blazed grating structures 23 may correspond to the fourth blazed grating structures 24 in one to one relationship, and projections of each of the fourth blazed mating structure 24 on the fourth edge 304 and the projections of the corresponding third blazed grating structure 23 on the second edge 302 may be overlapped.

Each fourth blazed grating structure 24 may correspond to a light source 3 as shown in FIG. 5. In FIG. 5, light, incident to the light guide plate 1, of the light source, after being diffracted by the fourth blazed grating structure 24, may be incident to the surface of the light guide plate 1 again, and is totally reflected for many times in the light guide plate 1, thereby implementing light propagation. As shown in FIG. 6, the light is propagated in a direction from the fourth edge 304 to the second edge 302.

With the light guide plate shown in FIG. 6, partitioned control over the backlight source may be implemented. For example, when a display area corresponding to a left side of the light guide plate is required to be brighter, the light sources opposite to the first one of third blazed grating structures 23 on the left side and the first one of fourth blazed grating structures 24 on the left side may be controlled to be turned on, and the other light sources that relate to on the left side may be controlled to be turned on. The other two of third blazed grating structures 23 and the other two of fourth blazed grating structures 24 may be controlled to be turned off.

When a display area corresponding to a middle part of the light guide plate is required to be brighter, the light sources opposite to the second one of third blazed grating structures 23 on the left side and the second one of fourth blazed grating structures 24 on the left side may be controlled to be turned on, and the other light sources may be controlled to be turned off.

When a display area corresponding to a right side of the light guide plate is required to be brighter, the light sources opposite to the third one of third blazed grating structures 23 from the left side and the third one of fourth blazed grating structures 24 from the left side may be controlled to be turned on, and the other light sources may be controlled to be turned off.

In FIG. 6, the number of the third blazed grating structures 23 and the number of the fourth blazed grating structures 24 are both 3. However, the number of the third blazed grating structures 23 and the number of the fourth blazed grating structures 24 may not be limited to be 3, and may be more or less than 3.

Further, in the embodiment, the number of the third blazed grating structures 23 may be 1. When the number of the third blazed grating structures 23 is 1, in order to make the light in the light guide plate as uniform as possible, the length of the third blazed grating structure 23 may be as large as possible, and preferably, the length of third the blazed grating structure 23 may be equal to the length of the second edge 302.

The number of the fourth blazed grating structures 24 may also be 1. When the number of fourth the blazed grating structures 24 is 1, in order to make the light in the light guide plate as uniform as possible, the length of the fourth blazed grating structure 24 may be as large as possible, and preferably, the length of the fourth blazed grating structure 24 may be equal to the length of the fourth edge 304.

Sometimes, in order to guide the light having a total reflection inside the light guide plate out, a scattering structure may be placed in the surface of the light guide plate. The scattering structure may reflect the light and guide the light out of the light guide plate. The scattering structure may have a number of forms. For example, the scattering structure may be a net, structure or an irregular scattering structure. The scattering structure may also be a dot pattern structure. When the light irradiates on the scattering structure, the light may no longer be totally reflected inside the light guide plate and thus the scattering structure may scatter the light in the light guide plate and the light may then be guided out of the light guide plate.

Figure 7:
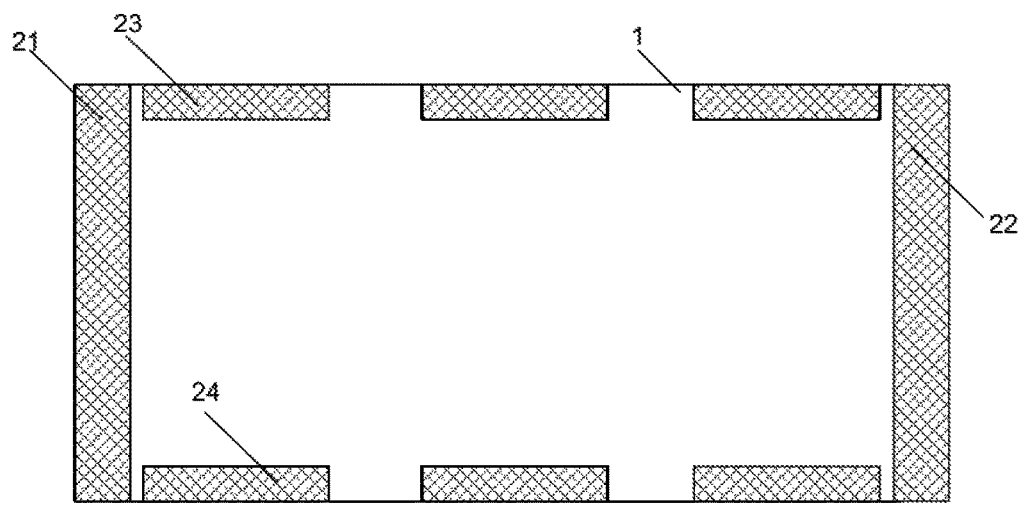

Further, in the embodiment, as shown ire FIG. 7, blazed grating structures may also be arranged on the four edges of the emergent surface of the light guide plate and the number of the blazed gating structures close to and along each edge may be 1, or may also be more than one. However, in order to make the light in the light guide plate as uniform as possible, the blazed grating structures close to and along every two opposite edges may be symmetrically arranged.

Figure 8:
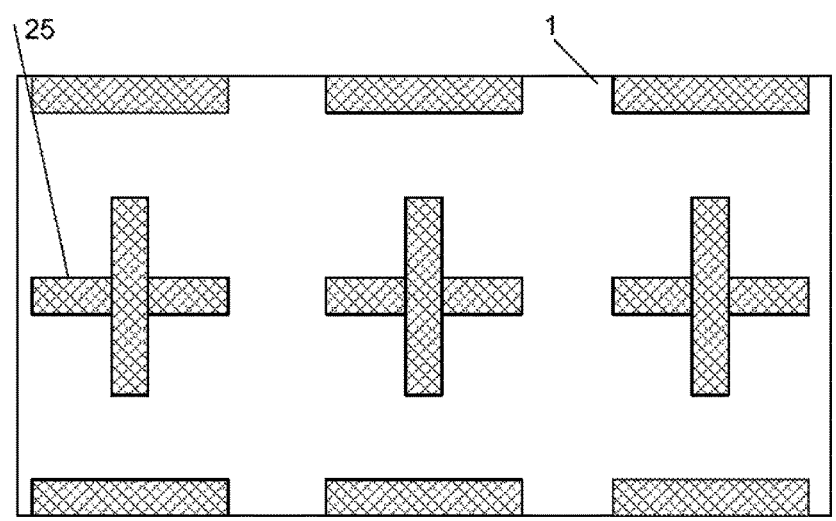

Further, in the embodiment, as shown in FIG. 8, on the basis of the embodiment shown in FIG. 6, multiple groups of blazed grating structures may further be arranged in a middle area of the emergent surface of the light guide plate. Each group of blazed grating structures may include two fifth blazed grating structures 25, and the two fifth blazed grating structures may be arranged crosswise to form a two-dimensional blazed grating. As shown in FIG. 8, the two fifth blazed grating structures 25 are arranged crosswise in the middle area of the emergent surface. In some implementations, the two fifth blazed grating structures may be arranged crosswise in other areas of the emergent surface. For example, the cross structure may be placed towards the top or towards the bottom areas of the emergent surface. In the backlight source including the light guide plate of the embodiment, a light source may be arranged corresponding to the two fifth blazed grating structures 25, and the two fifth blazed grating structures 25 may make light of the corresponding light source diffracted in two different directions after being incident to the light guide plate.

Specifically, an angle formed by the two fifth blazed grating structures may be 90°. The light of the light source opposite to the fifth blazed grating structures 25 may be diffracted in two mutually perpendicular directions after being incident to the light guide plate.

Further, in order to improve the luminance of the backlight source, more than more light sources and more than one group of blazed grating structures opposite to the light sources may be arranged. The multiple groups of blazed grating structures may be arranged on the emergent surface of the light guide plate in an array.

With the light guide plate shown in FIG. 8, partitioned control over the backlight source may be implemented. For example, when a display area corresponding to a certain part of the light guide plate is required to be brighter, the light sources opposite to the blazed grating structures of this part may be controlled to be turned on, and the other light sources may be controlled to be turned off.

Further, on the basis of the embodiment shown in FIG. 8, third blazed grating structures 23 and fourth blazed grating structures 24 may not be arranged, and only the fifth blazed grating structures 25 are arranged in the middle area of the emergent surface of the light guide plate.

Figure 9:
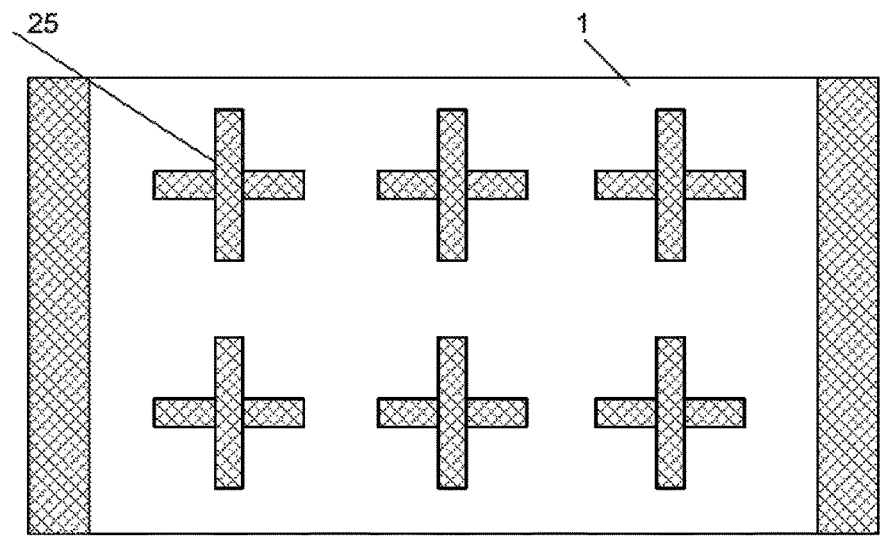

Further, as shown in FIG. 9, the fifth blazed grating structures 25 may further be arranged in the middle area of the emergent surface of the light guide plate on the basis of the embodiment shown in FIG. 4, so that higher luminance may be provided by the backlight source.

Figure 10:
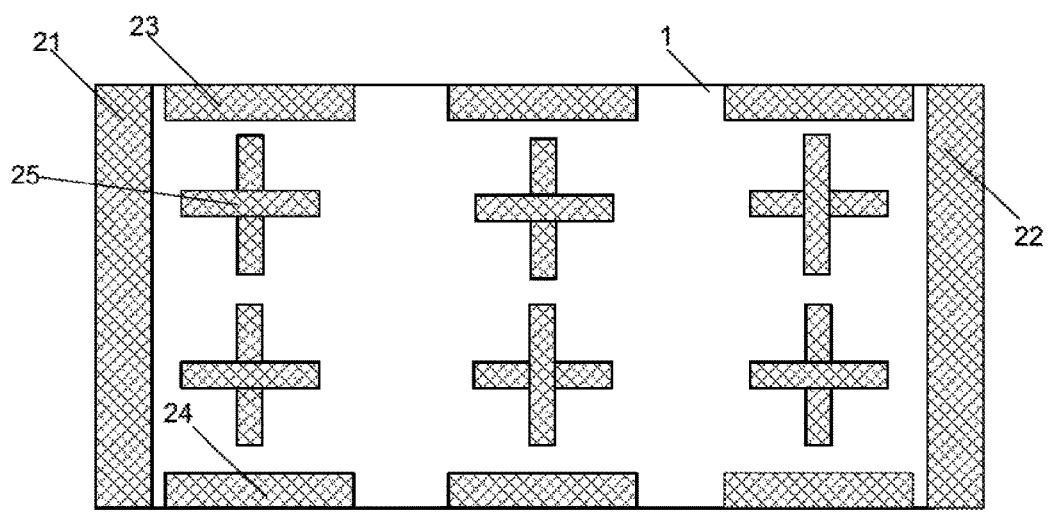

Further, as shown in FIG. 10, the fifth blazed grating structures 25 may further be arranged in the middle area of the emergent surface of the light guide plate on the basis of the embodiment shown in FIG. 7, so that higher luminance may be provided by the backlight source.

Those skilled in the art should appreciate that in the embodiment, each time when one or a group of blazed grating structures is added, the backlight source including the light guide plate of the embodiment may correspondingly add a light source opposite to the blazed grating structure(s). The light source may be of a point shape, or may be matched with the shape of the corresponding blazed grating structure. For example, when the blazed grating structure is a long strip, the light source may also be a long-strip light source. Preferably, the length of the light source is equal to the length of the blazed grating structure. The light of the corresponding light source is propagated in the light guide plate after being diffracted by the blazed grating structure. The light sources may be controlled to be turned on/off to control brightness of the corresponding areas of the light guide plate, thereby implementing partitioned control over the backlight source.

The example provides as backlight source, which may include the light guide plate as described above and may further include multiple light sources arranged on one side of an incident surface of the light guide plate in an array. Light emergent from the light sources, after irradiating a blazed grating structure on an emergent surface of the light guide plate and being diffracted by the blazed gating structure, may be totally reflected in the light guide plate.

At least one blazed grating structure is arranged on the light guide plate of the backlight source of the example, the blazed grating structure may concentrate light energy in a predetermined direction, i.e. a certain spectral order, and may improve diffraction efficiency of the light to make the diffracted light fully utilized. Due to such a characteristic of the blazed grating structure, the thickness of the direct-down type backlight source may be reduced, and an ultrathin backlight source may be achieved. Moreover, the backlight source of the embodiment may be a direct-down type backlight source, and linear partitioning may be implemented in both a perpendicular direction and a horizontal direction, thereby implementing partitioned control over the backlight source.

The example provides a display device. The display device may include the backlight source as described above. The display device may be any product or part with a display function such as a liquid crystal television, an LCD, a digital photo frame, a mobile phone and a tablet computer, where the display device may further include a flexible circuit board, a printed circuit board and a backboard.

The example provides a method for manufacturing a light guide plate, which can be used to manufacture the above-mentioned light guide plate. The manufacturing method may include the following steps.

In Step 1, a light guide plate substrate is provided. The light guide plate substrate may be made from glass or an organic material, and the organic material is, for example, PolyMethyl MethAcrylate (PMMA) or PolyCarbonate (PC).

In Step 2, a first surface of the light guide plate substrate may be coated with a photoresist, exposure and development may be performed on the photoresist, the first surface of the light guide plate substrate may be etched to form a groove of at least one blazed grating structure in the first surface, and the photoresist may be removed. The groove may also be formed by a nanoimprint method.

Nanoimprint lithography may be a method of fabricating nanometer scale patterns. In general, nanoimprint method is a nanolithography process with low cost, high throughput and high resolution.

In Step 3, a metal reflective layer, such as Al or Ag, may be evaporated or deposited on a groove surface of the groove of the blazed grating structure to form the blazed grating structure.

In the embodiment, by arranging the at least one blazed grating structure on the light guide plate, the blazed grating structure may concentrate light energy in a predetermined direction, i.e. a certain spectral order, and may improve diffraction efficiency of light to make the diffracted light fully utilized. Due to such a characteristic of the blazed grating structure, the thickness of the direct-down type backlight source may be reduced, an ultrathin backlight source may be achieved, and linear partitioning may be implemented in both a perpendicular direction and a horizontal direction, thereby implementing partitioned control over the backlight source.

The present disclosure provides a light guide plate. The light guide plate may include an incident surface; an emergent surface; and at least one blazed grating structure that is on the emergent surface of the light guide plate, where the at least one blazed grating structure may be configured to diffract light incident from an incident surface of the light guide plate, where the light incident forms a total reflection in the light guide plate after the light irradiates the at least one blazed grating structure.

Optionally, the emergent surface of the light guide plate may have a rectangular shape, at least one first blazed grating structure may be along a first edge of the emergent surface, and the at least one first blazed grating structure extends to the first edge.

Optionally, the at least one first blazed grating structure may be along the first edge, and the first blazed grating structure extending to the first edge may have a length that is equal to a length of the first edge.

Optionally, multiple first blazed grating structures may be along the first edge, and the multiple first blazed gating structures may be separated by a distance.

Optionally, the light guide plate may also include at least one second blazed grating structure is along a third edge of the emergent surface, the second blazed grating structure extends to the third edge, each of the second blazed grating structure corresponds to one of the first blazed grating structure.

Optionally, at least one third blazed grating structure may be along a second edge of the emergent surface, the second edge may be an edge adjacent to the first edge, and the third blazed grating structure extends in parallel to the second edge.

Optionally, one of the at least one third blazed grating structure is arranged along the second edge, and the third blazed pirating structure and the second edge have an equal length.

Optionally, the at least one third blazed grating structure comprises multiple third blazed grating structures that are arranged along the second edge, and the multiple third blazed grating structures are separated by a distance.

Optionally, at least one fourth blazed grating structure is along a fourth edge of the emergent surface, the fourth blazed grating structure extends to the fourth edge, each of the fourth blazed grating structure corresponds to one of the third blazed grating structure.

Optionally, the light guide plate according to the disclosure herein, may further include fifth blazed grating structures having multiple groups that are in a middle area of the emergent surface of the light guide plate, where each group of fifth blazed grating structures comprises two fifth blazed grating structures and the two fifth blazed grating structures are crosswise arranged.

Optionally, the two fifth blazed grating structures are formed with an angle that is substantially arranged.

Optionally, the blazed grating structure diffracts the incident light, that exits from the blazed grating structure at an angle $\beta$, and is incident to the surface of the light guide plate at an angle $\varphi$, $\varphi$ being not smaller than $\Phi_c$=arc sin $(1/n)$ and $2d \sin \theta \cos (\alpha-\theta)=k\lambda$, where n is a refractive index of a material of the light guide plate, $\alpha$ is an angle between the incident light, and a macro plane normal of the blazed grating structure, d is a groove spacing of the blazed gating structure, $\theta$ is a blazing angle of the blazed grating structure, k is an interference level, $\lambda$ is a blazed wavelength, and an angle between diffracted light of the blazed grating structure and the macro plane normal of the blazed grating structure is $\beta=2\theta-\alpha$.

The present disclosure provides a backlight source. The backlight source may include the light guide plate described above, and further may include: multiple light sources arranged on one side of an incident surface of the light guide plate in an array, wherein the light sources exit light to from the light sources form a total reflection in the light guide plate after the light it radiates a blazed grating structure on an emergent surface of the light guide plate and is diffracted by the blazed grating structure.

The present disclosure provides a display device. The display may include backlight source described above.

The present disclosure also provides a method of manufacturing a light guide plate. The method may include: providing a light guide plate substrate, etching the light guide plate substrate to form a groove of at least one blazed grating structure in the first surface and depositing a metal reflective layer on the groove to form the blazed grating structure.

Unless otherwise defined, technical terms or scientific terms used in the present disclosure should have general meanings understood by those with general skills in the field to which the present disclosure belongs. "First", "second" and similar words used in the present disclosure do not represent any sequence, number or importance, and are only employed to distinguish different parts. "Include", "contain" or other similar words refers to that a component or object before the word covers a component or object and its equivalent listed after the word, with other components or objects not excluded. "Connect", "interconnect" or the other similar words is not limited to physical or mechanical connections, but may include electrical connections, direct or indirect, "Upper", "lower", "left", "right" and the like are only employed to represent a relative positional relationship, and after an absolute position of a described object changes, the relative positional relationship may also change correspondingly.

The above is the preferred implementation mode of the present disclosure. It is important to point out that those skilled in the art may further make multiple improvements and embellishments without departing from the principle of the present disclosure, and these improvements and embellishments shall be considered within the scope of protection of the present disclosure.

What is claimed is:

1. A light guide plate, comprising:
   a first surface;
   a second surface; and
   at least one blazed grating structure on the second surface,
      wherein the at least one blazed grating structure is configured to diffract light incident from the first surface, wherein the light forms a total reflection in the light guide plate after the light irradiates the at least one blazed grating structure; and
      the at least one blazed grating structure comprises a plurality of crossed grating structures in a middle area of the second surface, a respective one of the plurality of crossed grating structures comprising two blazed grating structures crossing each other.

2. The light guide plate according to claim 1, wherein the second surface of the light guide plate has a rectangular shape, the at least one blazed grating structure comprises at least one first blazed grating structure, the at least one first blazed grating structure is proximal to a first edge of the second surface.

3. The light guide plate according to claim 2, wherein one of the at least one first blazed grating structure along the first edge has a length that is substantially equal to a length of the first edge.

4. The light guide plate according to claim 2, wherein the at least one blazed grating structure comprises multiple first blazed grating structures alone the first edge of the second surface, and adjacent first blazed grating structures are separated by a distance.

5. The light guide plate according to claim 2, wherein the at least one blazed grating structure further comprises at least one second blazed grating structure proximal to a third edge of the second surface, the third edge is an edge parallel to the first edge, each of the at least one second blazed grating structure corresponds to one of the first blazed grating structure.

6. The light guide plate according to claim 2, wherein the at least one blazed grating structure further comprises at least one third blazed grating structure proximal to a second edge of the second surface, the second edge is an edge adjacent to the first edge.

7. The light guide plate according to claim 6, wherein one of the at least one third blazed grating structure along the second edge has a length that is substantially equal to a length of the second edge.

8. The light guide plate according to claim 6, wherein the at least one third blazed grating structure comprises multiple third blazed grating structures, and adjacent third blazed grating structures are separated by a distance.

9. The light guide plate according to claim 6, wherein the at least one blazed grating structure further comprises
   at least one fourth blazed grating structure proximal to a fourth edge of the second surface, the fourth edge is an edge parallel to the second edge, each of the at least one fourth blazed grating structure corresponds to one of the third blazed grating structure.

10. The light guide plate according to claim 1, wherein the at least one blazed grating structure comprises a plurality of steps, a respective one of the plurality of steps has a triangular cross-section.

11. The light guide plate according to claim 1, wherein the two blazed grating structures crossing each other at an angle that is substantially 90°.

12. The light guide plate according to claim 1, wherein the light incident from the first surface exits from the blazed grating structure, and the light exits from the blazed grating structure incident to the surface of the light guide plate at an angle $\varphi$, $\varphi c$ is a total reflection critical angle of the light guide plate, $\varphi$ being not smaller than $\varphi c$, $$\Phi_c = \arcsin(1/n) \text{ and}$$

$$2d \sin\theta \cos(\alpha-\theta) = k\lambda,$$

where n is a refractive index of a material of the light guide plate, $\alpha$ is an angle between the incident light and a macro plane normal of the blazed grating structure, d is a groove spacing of the blazed grating structure, $\theta$ is a blazing angle of the blazed grating structure, k is an interference level, $\lambda$ is a blazed wavelength, and an angle between diffracted light of the blazed grating structure and the macro plane normal of the blazed grating structure is $\beta = 2\theta - \alpha$.

13. The light guide plate according to claim 1, wherein the first surface is an incident surface and the second surface is an emergent surface.

14. A backlight source, comprising the light guide plate according to claim 1, and further comprising: multiple light sources on a side of the first surface of the light guide plate.

15. The backlight source according to claim 14, wherein the first surface is opposite to the second surface, each of the multiple light source corresponds to one of the first blazed grating structure.

16. The backlight source according to claim 14, further comprising scattering structures on the first surface configured to scatter the light in the light guide plate.

17. A display device, comprising the backlight source according to claim 14.

18. A method of manufacturing a light guide plate, comprising:
   providing a light guide plate substrate;
   forming a groove of at least one blazed grating structure in a surface of the light guide plate substrate; and
   forming a metal reflective layer on the groove to form the blazed grating structure;

wherein forming the blazed grating structure comprises forming a plurality of crossed grating structures in a middle area of the surface, a respective one of the plurality of crossed grating structures formed to comprise two blazed grating structures crossing each other.

19. The method according to claim 18, wherein forming the metal reflective layer on the groove to form the blazed grating structure comprises:

depositing a metal reflective layer on the groove.

20. The method according to claim 18, wherein forming the groove of at least one blazed grating structure in the first surface comprises:

coating a photoresist layer on a second surface of the light guide plate substrate;

exposing the photoresist layer with a mask plate;

developing the exposed photoresist layer to obtain a photoresist pattern; and etching the light guide plate substrate to form a groove.

* * * * *